United States Patent
Kim et al.

(10) Patent No.: US 9,203,532 B2
(45) Date of Patent: *Dec. 1, 2015

(54) STATION OPERATION METHOD AND APPARATUS IN TV WHITESPACE

(75) Inventors: Eunsun Kim, Anyang-si (KR); Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 56 days.

This patent is subject to a terminal disclaimer.

(21) Appl. No.: 13/570,000

(22) Filed: Aug. 8, 2012

(65) Prior Publication Data

US 2012/0314658 A1 Dec. 13, 2012

Related U.S. Application Data

(63) Continuation of application No. 13/459,826, filed on Apr. 30, 2012, now Pat. No. 8,605,741, which is a continuation of application No. 13/395,564, filed as application No. PCT/KR2011/000545 on Jan. 26, 2011.

(60) Provisional application No. 61/298,213, filed on Jan. 26, 2010, provisional application No. 61/417,269, filed on Nov. 25, 2010, provisional application No. 61/417,288, filed on Nov. 26, 2010, provisional application No. 61/420,769, filed on Dec. 7, 2010.

(51) Int. Cl.
| | |
|---|---|
| H04W 52/04 | (2009.01) |
| H04H 20/42 | (2008.01) |
| H04H 60/92 | (2008.01) |
| H04W 8/20 | (2009.01) |
| H04W 52/24 | (2009.01) |
| G06F 17/30 | (2006.01) |

(Continued)

(52) U.S. Cl.
CPC ............. *H04H 20/42* (2013.01); *H04H 60/92* (2013.01); *H04W 8/20* (2013.01); *H04W 52/243* (2013.01); *G06F 17/30592* (2013.01); *H04H 20/22* (2013.01); *H04W 16/14* (2013.01); *H04W 52/367* (2013.01); *H04W 72/0406* (2013.01); *H04W 84/12* (2013.01)

(58) Field of Classification Search
USPC ................. 370/252, 310–312, 318, 328–338; 455/522, 456.5, 432.1; 375/240.28; 713/168; 702/185
See application file for complete search history.

(56) References Cited

U.S. PATENT DOCUMENTS

| | | | | |
|---|---|---|---|---|
| 6,205,333 | B1 * | 3/2001 | Abe | ........................... 455/432.1 |
| 6,519,464 | B1 * | 2/2003 | Santhoff et al. | ............ 455/456.5 |

(Continued)

FOREIGN PATENT DOCUMENTS

| | | |
|---|---|---|
| CN | 1152987 A | 6/1997 |
| CN | 1943257 A | 4/2007 |

(Continued)

OTHER PUBLICATIONS

Kraemer et al, IEEE 802.11Z/D6.0, Aug. 2009.*

(Continued)

*Primary Examiner* — Vincelas Louis
(74) *Attorney, Agent, or Firm* — Morgan, Lewis & Bockius LLP

(57) ABSTRACT

The present invention relates to a channel switching scheme. By this scheme, a first station transmits a channel switching request frame comprising target channel information and transmit power control information for the target channel to a second station. And, the second station transmits a channel switch response frame to the first station. After these, the second station transmits a signal on the target channel. Here, parameters in the above transmit power control information are used for transmit power control calculation of the second station for the target channel.

12 Claims, 15 Drawing Sheets

(51) Int. Cl.
| | |
|---|---|
| H04H 20/22 | (2008.01) |
| H04W 16/14 | (2009.01) |
| H04W 52/36 | (2009.01) |
| H04W 72/04 | (2009.01) |
| H04W 84/12 | (2009.01) |

(56) References Cited

U.S. PATENT DOCUMENTS

| | | | |
|---|---|---|---|
| 8,165,092 B2 * | 4/2012 | Gandham et al. | 370/331 |
| 8,438,389 B2 * | 5/2013 | Yao et al. | 713/168 |
| 8,472,373 B2 * | 6/2013 | Hsu et al. | 370/328 |
| 8,483,155 B1 * | 7/2013 | Banerjea et al. | 370/329 |
| 2004/0137905 A1 | 7/2004 | Jeong et al. | 455/450 |
| 2004/0264394 A1 * | 12/2004 | Ginzburg et al. | 370/310 |
| 2005/0255872 A1 * | 11/2005 | Lundell et al. | 455/522 |
| 2006/0030318 A1 | 2/2006 | Moore et al. | |
| 2007/0178927 A1 * | 8/2007 | Fernandez-Corbaton et al. | 455/522 |
| 2007/0213084 A1 | 9/2007 | Biru et al. | |
| 2007/0253394 A1 | 11/2007 | Horiguchi et al. | |
| 2008/0144726 A1 * | 6/2008 | Ingber et al. | 375/240.28 |
| 2008/0175193 A1 | 7/2008 | So et al. | |
| 2008/0188222 A1 | 8/2008 | Oh | |
| 2009/0197627 A1 * | 8/2009 | Kuffner et al. | 455/522 |
| 2009/0298522 A1 * | 12/2009 | Chaudhri et al. | 455/509 |
| 2010/0103850 A1 * | 4/2010 | Gossain et al. | 370/312 |
| 2011/0019104 A1 | 1/2011 | Kwak et al. | |
| 2011/0069689 A1 * | 3/2011 | Grandhi et al. | 370/338 |
| 2011/0080882 A1 * | 4/2011 | Shu et al. | 370/329 |
| 2011/0087639 A1 * | 4/2011 | Gurney | 707/690 |
| 2011/0096770 A1 | 4/2011 | Henry | |
| 2011/0116458 A1 * | 5/2011 | Hsu et al. | 370/329 |
| 2012/0026997 A1 * | 2/2012 | Seok et al. | 370/338 |
| 2012/0314614 A1 * | 12/2012 | Wentink et al. | 370/252 |

FOREIGN PATENT DOCUMENTS

| | | |
|---|---|---|
| CN | 1994004 A | 7/2007 |
| CN | 101213763 A | 7/2008 |
| JP | 2007-088940 A | 4/2007 |
| JP | 2007-300419 A | 11/2007 |
| JP | 2009-100452 A | 5/2009 |
| JP | 2012-523207 A | 9/2012 |
| WO | 2007/000740 A1 | 1/2007 |
| WO | 2009/155016 A2 | 12/2009 |

OTHER PUBLICATIONS

U.S. Office Action (U.S. Appl. No. 13/395,564), dated Dec. 21, 2012.
English Translation of Written Opinion of the International Search Authority.
Borth et al. "Considerations for Successful Cognitive Radio Systems in US TV White Space," Proceedings of 3rd IEEE Symposium on New Frontiers in Dynamic Spectrum Access Networks, pp. 1-5 (Oct. 17, 2008).
Meinrath et al. "Unlicensed 'White Space Device' Operations on the TV Band and the Myth of Harmful Interference." Wireless Future Program of New American Foundation, (Apr. 2008).
Shellhammer et al. "Technical challenges for cognitive radio in the TV white space spectrum," Proceedings of IEEE Information Theory and Applications Workshop, pp. 8-13 (2009).
International Search Report issued in corresponding PCT Application No. PCT/KR2011/000545 mailed Sep. 28, 2011.
European Search Report (Application No. 12005571), dated Oct. 5, 2012.
Menzo Wentink (Qualcomm): "Tunneled Direct Link Setup with Channel Switching; 11-07-2762-06-000z-tunneled-direct-link-setup-with-channel-switching", IEEE Draft; 11-07-2762-06-000Z-Tunneled-Direct-Link-Setup-With-Channel-Switching, IEEE-SA Mentor, Piscataway, NJ USA, vol. 802.11z, No. 6, May 12, 2008, pp. 1-8. XP017682607, [retrieved on May 12, 2008] *paragraph [7.2.2.1.8] to paragraph [7.2.2.1.9]*.
"Dynamic Multilevel Power Control", IEEE Draft; 11-05-1068-00-000V-MULTILEVELRFPOWER, IEEE-SA Mentor, Piscataway, NJ USA, vol. 802.11v, Nov. 4, 2005, pp. 1-8, XP017688373, [retrieved on Nov. 11, 2005] *paragraph [7.3.2.15] to paragraph [11.5.2].
Office Action dated Sep. 28, 2014, issued by the State Intellectual Property Office of China in Chinese Patent Application No. 201180004740.7.
Supplementary European Search Report dated Oct. 13, 2014, issued by the European Patent Office in European Patent Application No. 11737281.3.

* cited by examiner

FIG. 4
(a) vacant TV channels
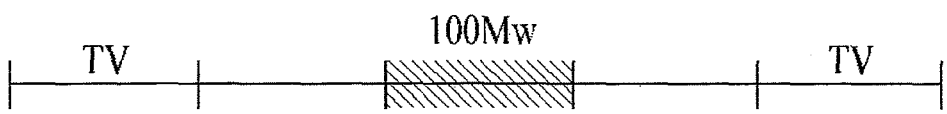
(b) Available TV channel for fixed device
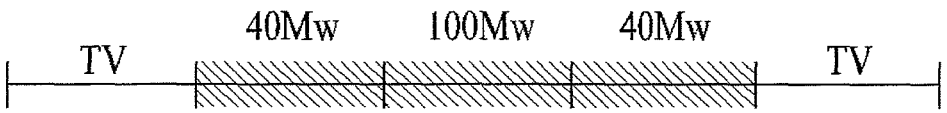
(c) Available TV channel for personal/portable device

FIG. 5

These three fields are repeated as determined by length field

| device type | Map ID | channel number | maximum power level | valid time (optional) |
|---|---|---|---|---|

Octets: 1     1     1     1     1

FIG. 6

These fields are repeated as determined by length field

| Category | Action value | RequesterSTA Address | ResponderSTA Address | Length | Available channel number |
|---|---|---|---|---|---|

Octets: 1     1     6     6     1     1

FIG. 7

These three fields are repeated as determined by length field

| Category | Action value | Requester STA Address | Responder STA Address | Length | channel schedule type | available channel number | available start time | available duration |
|---|---|---|---|---|---|---|---|---|

Octets: 1     1     6     6     1     1     1     8     2

FIG. 8

| element ID | length | country code | channel map |
|---|---|---|---|
| Octets: 1 | 1 | 3 | N |

FIG. 9

| | device type | channel number N | maximum transmit power level on channel number N | channel number M | maximum transmit power level on channel number M | .... | channel number K | maximum transmit power level on channel number K | valid time |
|---|---|---|---|---|---|---|---|---|---|
| Octets: | 1 | 1 | 1 | 1 | 1 | | 1 | 1 | 8 |

FIG. 10

| | device type | channel number N | maximum transmit power level on channel number N | valid time | .... | channel number K | maximum transmit power level on channel number K | valid time |
|---|---|---|---|---|---|---|---|---|
| Octets: | 1 | 1 | 1 | 8 | | 1 | 1 | 8 |

FIG. 11

| | device type | start channel number | number of channels | channel bitmap | valid time |
|---|---|---|---|---|---|
| Octets: | 1 | 1 | 1 | variable | 8 |

FIG. 12

These four fields are repeated according to available channels

| | device type | start frequency | stop frequency | maximum allowable transmit power | valid time |
|---|---|---|---|---|---|
| Octets: | 1 | 1 | 1 | variable | 8 |

FIG. 13

These four fields are repeated according to available channel

|  | device type | start frequency | stop frequency | maximum allowable transmit power | valid time |
|---|---|---|---|---|---|
| Octets: | 1 | 1 | 1 | variable | 8 |

FIG. 14

These four fields are repeated according to available channel

|  | device type | center frequency | channel bandwidth | maximum allowable transmit power | valid time |
|---|---|---|---|---|---|
| Octets: | 1 | 1 | 1 | Variable | 8 |

FIG. 15

These three fields are repeated
according to available channel

|         | device type | center frequency | channel bandwidth | maximum allowable transmit power | valid time |
|---------|-------------|------------------|-------------------|----------------------------------|------------|
| Octets: | 1           | 1                | 1                 | Variable                         | 8          |

FIG. 16

|   | device type | channel number N | maximum transmit power level on channel number N | valid time |
|---|-------------|------------------|--------------------------------------------------|------------|
|   | fixed device | 3               | 100mW                                            |            |

FIG. 17

| | device type | channel number N | maximum transmit power level on channel number N | channel number M | maximum transmit power level on channel number M | channel number K | maximum transmit power level on channel number K | valid time |
|---|---|---|---|---|---|---|---|---|

Octets:  personal/portable device    2    40mW    3    100mW    4    40mW

FIG. 18

| | device type | channel number M | maximum transmit power level on channel number M | valid time |
|---|---|---|---|---|

Fixed & personal/portable device    3    100mW

FIG. 19

| | device type | channel number N | maximum transmit power level on channel number N | channel number K | maximum transmit power level on channel number K | valid time |
|---|---|---|---|---|---|---|
| | personal/ portable device | 2 | 40mW | 4 | 40mW | |

FIG. 21
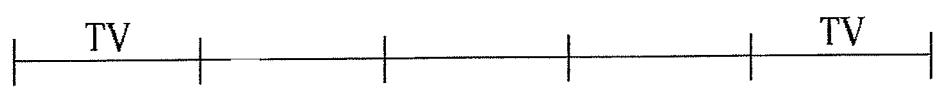
(a) vacant TV channels
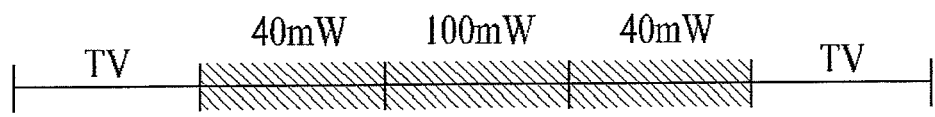
(b) available TV channels for personal/
portable device using spectrum mask class A
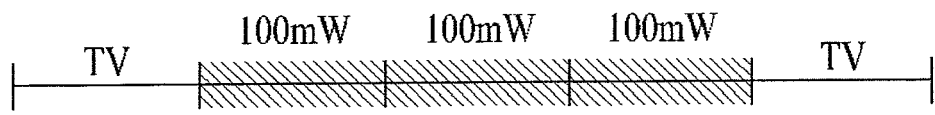
(c) available TV channels for personal/
portable device using spectrum mask class B

STATION OPERATION METHOD AND APPARATUS IN TV WHITESPACE

CROSS-REFERENCE TO RELATED APPLICATION(S)

This application is a continuation of U.S. patent application Ser. No. 13/459,826, filed on Apr. 30, 2012 now U.S. Pat. No. 8,605,741; which is a continuation of U.S. patent application Ser. No. 13/395,564, filed on Mar. 12, 2012; which is a National Stage of and claims the benefit under 35 U.S.C. §371 of International Application No. PCT/KR2011/000545, filed on Jan. 26, 2011; which claims the benefit of U.S. Provisional Application No. 61/298,213, filed on Jan. 26, 2010, U.S. Provisional Application No. 61/417,288, filed Nov. 26, 2010, U.S. Provisional Application No. 61/417,269, filed Nov. 25, 2010, and U.S. Provisional Application No. 61/420,769, filed on Dec. 7, 2010; the entire disclosure of each of which is incorporated herein by reference for all purposes.

BACKGROUND OF THE INVENTION

1. Field of the Invention

The present invention relates to a station (hereinafter, referred to as 'STA') operation method and apparatus in TV whitespace.

2. Discussion of the Related Art

Standards for WLAN (Wireless Local Area Network) technologies are developed as IEEE 802.11 standards. Among amendments of the IEEE 802.11 standards, IEEE 802.11a/b provide transmission rates of 11 Mbps (IEEE 802.11b) and 54 Mbps (IEEE 802.11a) using an unlicensed band at 2.4 GHz or 5 GHz. IEEE 802.11g provides a transmission rate of 54 Mbps using OFDM at 2.4 GHz. IEEE 802.11n provides a transmission rate of 300 Mbps for 4 spatial streams using MIMO-OFDM (Multiple Input Multiple Output-Orthogonal Frequency Division Multiplexing). IEEE 802.11n supports channel bandwidths of up to 40 MHz and, in this case, provides a transmission rate of 600 Mbps.

IEEE 802.11af standards regulate WLAN operation of an unlicensed device in a TV whitespace zone.

TV whitespace (referred to as 'TVWS' hereinafter) is a frequency allocated to broadcast TV and can include UHF and VHF bands. While the TVWS can include 54 MHz to 698 MHz (US and Korea), part of these frequency bands may not be used for unlicensed devices in some countries.

In a frequency band, an STA operating as an unlicensed device can use an available channel that is not used by a licensed device. Accordingly, it is important for an STA that needs to use TVWS to acquire information about an available channel that is not used by a licensed device. To achieve this, the STA can perform spectrum sensing at the location thereof in order to obtain information on the available channel.

Unlicensed devices using TVWS need to provide a protection function for operations of licensed devices (which may be referred to as 'incumbent users' or 'primary users'). That is, when an incumbent user such as a microphone uses a specific band used by an STA, the STA needs to stop using a channel corresponding to the band in order to protect the incumbent user.

To this end, STAs may require a frequency sensing mechanism. An energy detection scheme, a signature detection scheme and the like can be used as the frequency sensing mechanism. An STA can determine that a band is being used by an incumbent user if the intensity of a received signal exceeds a predetermined value, or when a DTV preamble is detected.

Furthermore, a signaling protocol such as a common beacon frame, the frequency sensing mechanism, etc. may be needed in order to solve the problem of coexistence of unlicensed devices using TVWS.

SUMMARY OF THE INVENTION

As described above, when an STA operating as an unlicensed device in TVWS depends only on frequency sensing to acquire information on an available channel, the burden of the STA due to sensing of a TVWS operation grows heavier and a TWVS operation procedure may be delayed. Moreover, information sensed by the STA may include a probabilistic error such as a false alarm, mis-detection, etc., and thus more accurate information is required according to location information.

Accordingly, the present invention provides a method in which an STA operating as an unlicensed device in TVWS performs a WLAN operation by effectively acquiring information on an available channel from a database on the basis of location information.

According to an aspect of the present invention, a station operation method in a TVWS (TV White Space) band, in which a station operating as an unlicensed device with permission to operate in an available channel that is not used by a licensed device operates in the TVWS band by acquiring information on the available channel, the station operation method including: transmitting an available channel information request message to a device having database information; receiving, from the device having database information, an available channel information response message including (a) identification information on an available channel, (b) information on valid time of the available channel, and (c) information on a maximum allowable power level in the available channel; and transmitting/receiving a signal using the information of (a), (b) and (c) using the maximum allowable power level within the valid time in the available channel.

One or both of the available channel information request message and the available channel information response message may include information on a plurality of available channels.

The available channel information response message may additionally include (d) information on a device type to which the available channel information response message can be applied.

The station may be an access point (AP) and the device having database information may be a database. In this case, the available channel information request message and the available channel information response message may be a channel scheduling request message and a channel scheduling response message, respectively.

The available channel information request message may include a category field that indicates the category of the available channel information request message, an action value field that indicates an action to be performed through the available channel information request message in the category, a source address field that indicates: the address of a device transmitting the available channel information request message, a destination address field that indicates a device receiving the available channel information request message, and a field that indicates identification information on a plurality of available channels.

The available channel information response message may include a category field that indicates the category of the available channel information response message, an action value field that indicates an action to be performed through the available channel information response message in the category, a source address field that indicates the address of a device transmitting the available channel information response message, a destination address field that indicates a device receiving the available channel information response message, and fields that indicate the information of (a), (b) and (c) for each of a plurality of available channels.

The information on valid time may include information on an available duration of the available channel, starting from when the available channel information response message is received, or include information on available start time of the available channel according to the available channel information response message, and information on an available duration of the available channel, starting from the available start time.

The available channel information response message may additionally include an identifier that indicates whether the information on valid time represents the information on an available duration of the available channel, starting from when the available channel information response message is received, or the information on available start time and information on an available duration of the available channel, starting from the available start time.

The device having database information may be an AP and the station may be provided with a service by the AP.

The information on valid time may be defined depending on the device type information. Specifically, the available channel information response message may not include the valid time information when the device type information corresponds to a first mode device that has no authority to directly access the database information, and the available channel information response message may include the valid time information when the device type information corresponds to a fixed device or a second mode device having the authority to directly access the database information.

The valid time information may include valid time information commonly applied to a plurality of available channels.

According to another aspect of the present invention, a station operating as an unlicensed device with permission to operate in an available channel that is not used by a licensed device in a TVWS band includes: a transceiver configured to transmit an available channel information request message to a device having database information and receive, from the device having database information, an available channel information response message including (a) identification information on an available channel, (b) information on valid time of the available channel, and (c) information on a maximum allowable power level in the available channel; and a processor configured to control the transceiver to transmit/receive a signal using the information of (a), (b) and (c) using the maximum allowable power level within the valid time in the available channel.

Advantageous Effects

According to the above-mentioned embodiments of the present invention, an STA operating as an unlicensed device in a TVWS band can execute a WLAN operation by effectively acquiring information on an available channel from a database on the basis of location information.

BRIEF DESCRIPTION OF THE DRAWINGS

FIG. 4 is a view referred to for describing available channel variation depending on a device type;

FIG. 5 illustrates a WSM structure according to an exemplary embodiment of the present invention;

FIG. 6 illustrates an exemplary channel scheduling request frame format according to an exemplary embodiment of the present invention;

FIG. 7 illustrates an exemplary channel scheduling response frame format according to an exemplary embodiment of the present invention;

FIG. 8 illustrates an exemplary WSM format;

FIGS. 9 and 10 illustrate exemplary channel map fields;

FIG. 11 illustrates an exemplary channel map field;

FIGS. 12 and 13 illustrate exemplary channel map fields;

FIGS. 14 and 15 illustrate exemplary channel map fields;

FIGS. 16 and 17 are views referred to for describing a method of respectively transmitting different information on an available channel to devices in the situation of FIG. 4 according to an exemplary embodiment of the present invention;

FIGS. 18 and 19 are views referred to for describing a method of informing each device of information on a common available channel and notifying a personal/mobile device of an additional available channel in the situation of FIG. 4 according to an exemplary embodiment of the present invention;

FIG. 21 is a view referred to for describing two personal/mobile devices having different maximum power values in the same TV channel when they use different frequency masks;

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Figure 1:
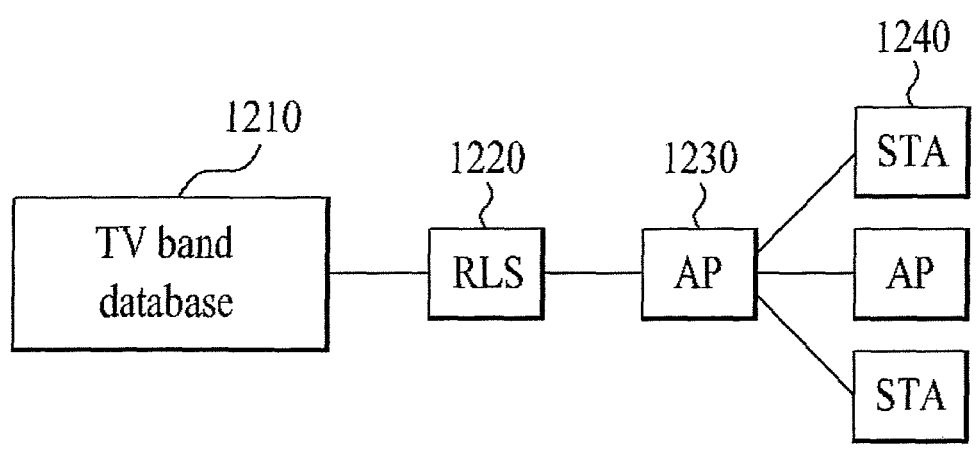
FIG. 1 illustrates a system structure to which the present invention can be applied.

FIG. 1 is a view referred to for describing a system structure to which the present invention can be applied.

An IEEE 802.11 TVWS STA is an unlicensed device that operates using an IEEE 802.11 MAC layer and PHY layer in a TVWS frequency band. STAs operating in a TVWS frequency band may be classified according to roles thereof into an STA 1230 operating as an AP (Access Point) and STAs 1240 provided with a service by the specific AP 1230.

The following embodiments of the present invention will be described on the assumption that the STAs 1230 and 1240 operating as unlicensed devices in TVWS use database information having available channel data according to regional locations thereof in order to acquire information on available channels.

A database 1210, for example, a TV band database may have information on available channels in a TV band. This database information includes considerably accurate location-based information of about 50 m, in general. An RLS (Registered Location Server) 1220 may be a server including information on registered locations of all APs operating in TVWS. While FIG. 1 illustrates the TV band database 1210 and the RLS 1220 as separate devices, they may be implemented as one TV band database device.

If an STA operating as an unlicensed device in TVWS needs to operate as an AP, the STA should register the location thereof in the RLS 1220. The AP 1230 can acquire available channel information of the database according to registrations. Then, the AP 1230 can provide the database information to the STAs 1240 chat belong thereto.

Figure 2:
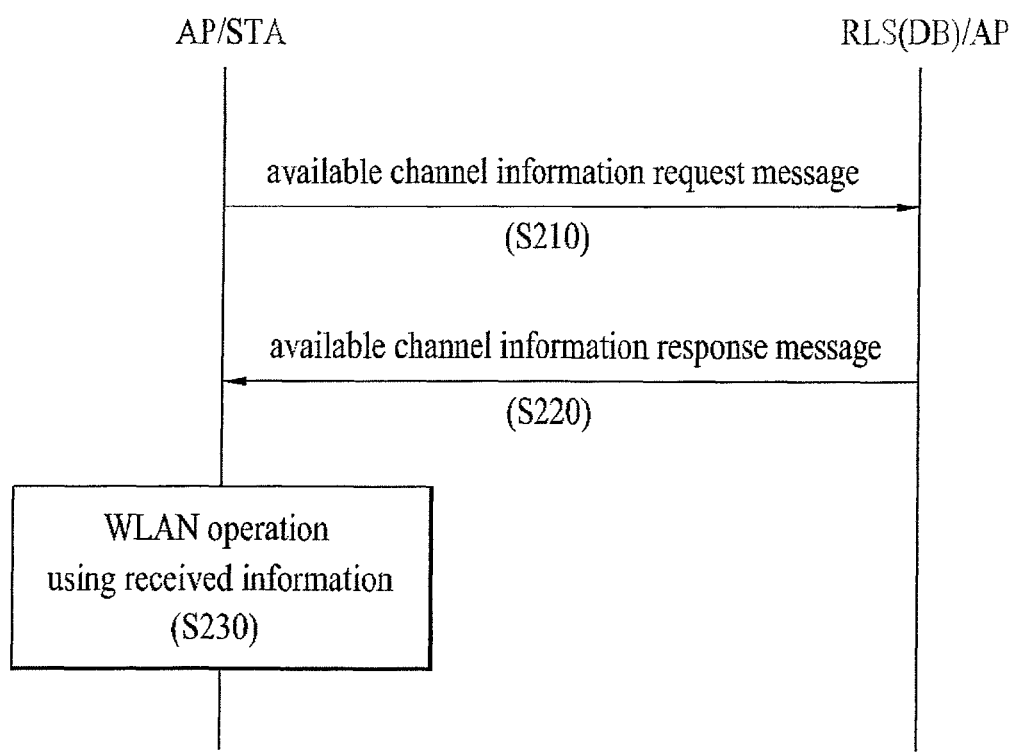
FIG. 2 is a flowchart illustrating a scheme in which an STA operates by acquiring available channel information from a device having database information according to an embodiment of the present invention.

FIG. 2 illustrates a method in which an STA operates by acquiring available channel information from a device having database information according to an embodiment of the present invention.

An STA operating as an unlicensed device in TVWS can transmit an available channel information request message to a device having database information (S210). The STA that transmits the available channel information request message may be an AP or an STA provided with a service by a specific AP. Specifically, the AP can transmit the available channel information request message to an RLS or database serving as a device having database information. Otherwise, an AP that has acquired database information according to this method can function as a device having database information and STAs belonging to the AP can transmit the available channel information request message to the AP.

The available channel information request message may have a format as shown in Table 1.

TABLE 1

| Order | Information |
|---|---|
| 1 | Category |
| 2 | Action |
| 3 | Destination MAC Address |
| 4 | Source MAC Address |
| 5 | Supported Channels |

As shown in Table 1, the available channel information request message according to the current embodiment of the present invention may include a category field, an action value field, a source address field, a destination address field, and a field indicating supported channels for one or more available channels.

The category field can represent the category of the available channel information request message, and the action value field can indicate an action to be performed through the available channel information request message in the category. The source address field can represent the address of an AP that transmits the available channel information request message. If an STA belonging to a specific AP transmits the available channel information request message, the source address field can indicate the address of the STA. The destination address field can indicate the address of an RLS (DB) when the RLS (DB) receives the available channel information request message and indicate the address of an AP when the AP receives the available channel information request message. Furthermore, the available channel information request message can include information on channels supported by an STA that transmits the available channel information request message. When the information indicates a plurality of channels, the available channel information request message can be transmitted in the form of a list of the plurality of channels.

The RLS (DB) or AP that has received the available channel information request message can transmit an available channel information response message to the AP or STA in response to the available channel information request message (S220). In the current embodiment, the available channel information response message includes the following information.

(a) Identification information on an available channel (b) Information on the maximum allowable power level in the available channel (C) Information on valid time of the available channel In another exemplary embodiment of the present invention, the available channel information response message may be transmitted without information on the maximum allowable power level in the available channel according to use of the available channel information response message. When the available channel information response message does not include the information on the maximum allowable power level in the available channel, it can be considered that only an action associated with the information of (b) is omitted. Thus, the following description is made on the assumption that the available channel information response message includes all the information of (a), (b) and (C) for convenience of explanation. However, it is noted that the action associated with the information of (b) can be omitted.

Different maximum power levels may be allowed for available channels that can be used by unlicensed devices in TVWS. For example, when CH1, CH2 and CH3 are indicated as available channels, different maximum transmit power levels may be allowed for the respective channels in consideration of the influence on a neighboring channel. For example, maximum transmit power values of 40 mW, 100 mW and 40 mW can be respectively allowed for CH1, CH2 and CH3. Information on a maximum allowable power level in an available channel can indicate the maximum allowable power for the available channel. This maximum allowable power may be maximum allowable power conforming to FCC regulations.

The information on valid time of the available channel can indicate information on a time for which a device that has received the available channel information response message is allowed to use the available channel. As described above, an unlicensed device operating in TVWS needs to execute a function of protecting an incumbent user. It is possible to efficiently control the function of protecting the incumbent user by informing the device of the information on the valid time of the available channel when the information on the available channel is indicated. For example, when valid time for an available channel is 10 minutes, an AP/STA that has received this information can use the available channel for 10 minutes from when the information is received. After the lapse of the valid time, the AP/STA can transmit the available channel information response message to a device (RLS (DB)/AP) having database information to acquire available channel information.

The number of each of the information elements of (a), (b) and (c) can correspond to the number of available channels. Table 2 shows an example of the available channel information response message.

TABLE 2

| Order | Information |
|---|---|
| 1 | Category |
| 2 | Action |
| 3 | Destination MAC Address |
| 4 | Source MAC Address |
| 5 | Target Channel(s) |
| 6 | White Space Available Time(s) |
| 7 | Power Constraint(s) |

Category, action value, destination address, and source address fields in Table 2 correspond to those shown in Table 1. In Table 2, "Target Channel(s)" may include (a) identification information on an available channel that will be used by an STA receiving the available channel information response message for a WLAN operation, and "White Space Available Time(s)" may include (b) information on valid time of the available channel. Further, "Power Constraint(s)" may represent maximum allowable transmit power for each available channel.

Upon reception of the available channel information, the device performs a WLAN operation using the received information (S230). Specifically, the device that has received the available channel information can transmit/receive a WLAN signal using power within the designated maximum allowable power for the designated valid time in the available channel according to the received information. If a specific AP receives the available channel information response message from an RLS (DB), the AP can transmit some or all of the received information to STAs belonging thereto. If an STA belonging to the specific AP receives the available channel information response message from the AP, the STA can limit a WLAN operation to an available channel indicated by the received available channel information response message in such a manner that the STA performs a scanning operation for network connection only for the designated available channel, to thereby mitigate scanning/sensing loads. In the following description, the aforementioned available channel information is simply referred to as a WSM (White Space MAP).

In an embodiment of the present invention, the aforementioned WSM additionally includes information on a device type to which the WSM is applied.

Figure 3:
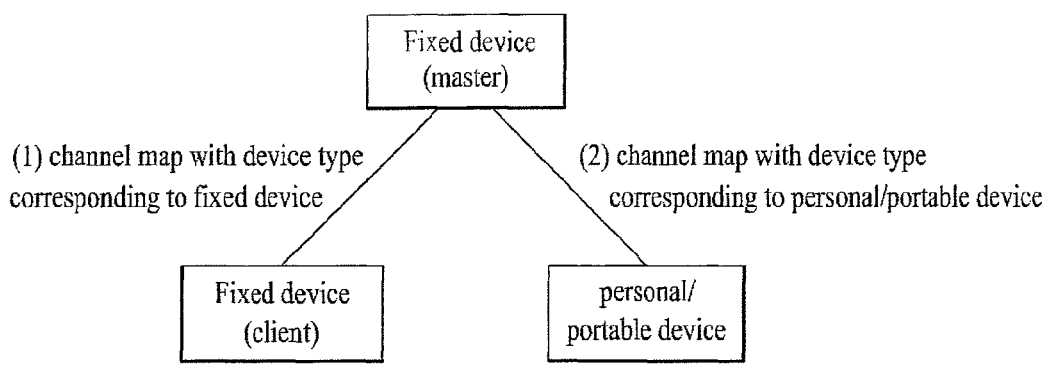
FIG. 3 is a view referred to for describing types of devices operating in a WLAN system for use in the present invention.

FIG. 3 is a view referred to for describing types of devices operating in a WLAN system for use in the present invention.

In the WLAN system to which the present invention is applied, devices can be largely divided into fixed devices and personal/portable devices. A fixed device can enter a network by sending an enable signal to one or more fixed devices and personal/portable devices according to regulations. FIG. 3 illustrates that a fixed device operates as an enabling STA of another fixed device and a personal/portable device to signal a channel map through an enable signal using a beacon.

As described above, information on the device type to which the WSM is applied is added to the WSM in the current embodiment because device types may have different available channels and maximum allowable power values. Fixed devices cannot use a channel next to a TV channel being used by an incumbent user. However, personal/portable devices can use the channel next to the TV channel being used by the incumbent user on the condition that the maximum allowable power value of the channel is reduced from 100 mW to 40 mW.

Therefore, the WSM preferably includes device type information along with available TV channel numbers and maximum transmit power field corresponding to each available TV channel. FIG. 3 shows that a fixed device operating as a master transmits a channel map (e.g. WSM) to another fixed device and a personal/portable device operating as clients. Specifically, the fixed device operating as a master respectively adds a device type corresponding to the other fixed device operating as a client and a device type corresponding to the personal/portable device to a WSM, transmits the WSM for the other fixed device (WSM having a device type field indicating the fixed device) to the other fixed device, and sends the WSM for the personal/portable device (WSM having a device type field indicating the personal/portable device) to the personal/portable device.

In the current embodiment, a device type does not signal the type of a device that transmits the WSM including the device type but signals the type of a device capable of using the WSM, which is provided with a service by the device transmitting the WSM. The device type information may signal the spectrum mask value of an STA capable of using the WSM in addition to information on a fixed device and personal/portable device.

It is assumed that a fixed device cannot use a WSM including a device type corresponding to a personal/portable device in the present embodiment of the invention. This is because when a WSM includes a device type field corresponding to a personal/portable device, a channel that cannot be used by a fixed device may be included in the WSM as an available channel.

FIG. 4 is a view referred to for describing an available channel variation depending on a device type.

In FIG. 4, on the assumption that the first channel is TV channel #21 and the last channel is TV channel #25, when TV channels #21 and #25 are occupied by an incumbent user, a fixed device can operate at a maximum power of 100 mW in TV channel #23 other than neighboring channels #22 and #24 of the TV channels #21 and #25 occupied by the incumbent user. A personal/portable device can operate at a maximum power of 40 mW in the neighboring channels #22 and #24 and at a maximum power or 100 mW in TV channel #23.

That is, channel map information depends on device type. A fixed device and a personal/portable device that receive WSM information need to identify channel maps assigned thereto. Accordingly, a fixed device in a master mode indicates whether a channel map is for a fixed device or a personal/portable device through a device type when transmitting the channel map.

FIG. 5 illustrates the structure of a WSM according to an exemplary embodiment of the present invention.

The WSM can include device type, map ID, channel number, maximum power level, and valid time fields. The device type can be used to indicate whether the WSM is for a fixed device or a personal/portable device, as described above. The map ID field can be used to distinguish the WSM from other WSMs, and the channel number field can indicate the number of a TV channel available in TVWS. It is noted that the present invention can indicate available channels using a method other than the channel number (e.g. an available frequency which will be described later). The maximum power level field can indicate a maximum power level allowed for each available channel according to FCC regulations as described above.

The WSM can include the field indicating valid time information on each available channel. The valid time field may indicate valid time information on each available channel or valid time information for the overall WSM. If the WSM is for a fixed device, the valid time field can include valid time information on each available channel. However, a device such as an STA belonging to a specific AP (referred to as 'first mode device' hereinafter) may not require the valid time information on each available channel. The first mode device may check whether the received WSM is valid by receiving an acknowledgement signal at predetermined intervals (e.g. every 60 seconds). Valid time information may be determined or omitted according to device type.

Descriptions will be given of detailed examples to which the above-described embodiments of the present invention are applied.

Example Applied to a Case in which a Device Capable of Transmitting a WSM Inquires of a Database of Scheduling Information on Each Available Channel It is assumed that the device capable of transmitting the WSM (e.g. an enabling STA that manages enabling of other unlicensed devices or a dependent AP that is enabled by a different device) configures the valid time field of the WSM through database query about a list of available channels constituting the WSM.

To achieve this, the enabling STA or dependent AP can transmit a channel scheduling request frame to a database.

FIG. 6 illustrates a format of a channel scheduling request frame according to an exemplary embodiment of the present invention.

The channel scheduling request frame can include channel scheduling information, that is, a channel list used to obtain available start time and an available duration of a specific TV channel. In FIG. 6, "Available Channel Number" field can indicate the channel list. For example, if available channels are CH1, CH2, CH3, and CH4, the channel scheduling request frame including channel numbers 1, 2, 3 and 4 can be transmitted. In this example, it is assumed that the enabling STA or dependent AP that requests channel scheduling information previously knows the available channels through the WSM.

In FIG. 6, "RequesterSTAAddress" indicates the address of the device that transmits the channel scheduling request frame. "ResponderSTAAddress" represents the address of a device that receives the channel scheduling request frame. "Length" can have a value depending on the number of available channels related with the channel scheduling information. "Available Channel Number" can indicate an available channel number corresponding to the channel scheduling information.

In this example, upon reception of the channel scheduling request frame, the database can transmit the information on the available start time and available duration of the channel designated by the requested channel number (e.g. the available channel number of the channel scheduling request frame) through a channel scheduling response frame in response to the request of the enabling STA or dependent AP.

FIG. 7 illustrates a format of a channel scheduling response frame according to an exemplary embodiment of the present invention.

In FIG. 7, "RequesterSTAAddress" indicates the address of a device that transmits a channel scheduling request frame. "ResponderSTAAddress" represents the address of a device that receives the channel scheduling request frame. "Length" indicates the overall length of channel scheduling information. "Available Channel Number" indicates an available channel corresponding to the channel scheduling information. "Available Start Time" can represent start time of an available duration of an available channel and "Available Duration" can indicate the available duration of the available channel.

If the available duration start time is always set to the current time (frame reception time), information on the available duration start time can be omitted. In this case, the channel scheduling response frame may include a channel scheduling type value indicting whether the channel scheduling response frame includes the available duration start time.

If the channel scheduling type is 0, the available duration start time is the current time (frame reception time) all the time and the channel scheduling response frame may not include the available duration start time. Conversely, if the channel scheduling type is 1, the available duration start time may be a future time and the channel scheduling response frame may include the available duration start time.

Example Applied to Channel Switching Mechanism

The above-mentioned embodiments are applied to a channel switching mechanism for STAs operating in a TVWS frequency band.

The STAs can directly perform channel switching during link transmission. The off-channel mechanism in IEEE 802.11z Tunneled Direct Link Setup (TDLS) is an example of the channel switching mechanism. The off-channel mechanism means that STAs moves to a channel that is not used by an AP to perform direct link transmission between the STAs. To achieve this, the STAs can negotiate a target channel through a channel switching request frame and a channel switching response frame, and then move to the target channel.

Furthermore, an STA can perform channel switching when the STA operates as an AP for other STAs. Wi-Fi Direct proposed by Wi-Fi Alliance Peer-to-Peer (P2P) group is an exemplary channel switching mechanism. In the Wi-Fi Direct, an STA can be linked as a client of an AP and, simultaneously, function as an AP for other STAs. Here, the STA can serve as an AP of STAs corresponding to clients thereof in a channel other than the channel over which the STA is linked as a client of the AP.

An STA operating in a TVWS frequency band preferably selects a target channel for channel switching. Furthermore, the STA preferably considers protection of an incumbent user when selecting the target channel. That is, the STA can be required to confirm whether the incumbent user is present through frequency sensing.

If an STA cannot secure database information based on regional location information thereof, the STA corresponds to a sensing only device and transmit power in a target channel is limited to 50 mW. On the contrary, if the STA can secure the database information, the STA can use up to 100 mW as transmit power even in the target channel.

Therefore, when an STA operating in a TVWS frequency band selects a target channel to perform channel switching, the target channel informs the STA of restrictions on transmit power thereof. To this end, the STA includes a power restriction information element in a channel switching request action management frame and transmits the channel switching request action management frame with the power restriction information element to a counterpart STA. Furthermore, the counterpart STA transmits a channel switching response action management frame including the power restriction information element in response to the channel switching request action management frame.

If STAs transmit different power restriction values, the maximum transmit power in the target channel can be determined as a lower power restriction value between the different power restriction values. For example, a fixed device can have a power restriction value different from that of a personal/portable device. In this case, a lower value of the two power restriction values is determined during power restriction value negotiation.

When an STA cannot secure database information, the STA may request an AP to allocate a target channel. For this, the STA can transmit a white space channel request action management frame to the AP. Then, the AP can respond to the request of the STA by transmitting a white space channel response action management frame. In this example, the white space channel response action management frame can include the number of the target channel allocated by the AP, information on allocated time, which indicates available time, and power restriction information.

The information on allocated time corresponds to a maximum time for which the target channel can be used. After the lapse of the allocated time, the STA should return to a basic channel or inquire of the AP about a target channel. This is for the AP to control the use of the target channel at predetermined intervals considering that an incumbent user is present in the allocated target channel.

When the AP allocates the target channel, maximum transmit power in the target channel can be determined through a power restriction information element.

When an incumbent user is present in the target channel allocated by the AP, the AP preferably informs STAs of the presence of the incumbent user through an unsolicited whitespace channel response action management frame. An STA that has received the unsolicited whitespace channel response action management frame can stop switching to a previously set target channel.

In other words, the whitespace channel request action management frame can be regarded as an example of the available channel information request message described with reference to FIG. 2, and the whitespace channel response action management frame can be considered to be an example of the available channel information response message described with reference to FIG. 2. Accordingly, the whitespace channel request action management frame can have the format of Table 1 and the whitespace channel response action management frame can have the format of Table 2.

The AP may reserve an arbitrary channel as a new target channel and then transmit information on the new target channel to STAs rather than being requested by the STA to allocate the new target channel. A backup channel is a representative of the arbitrary channel. When an incumbent user is present in a primary channel currently being used, the AP can move to the backup channel. The AP can include information on the backup channel in a beacon frame and a probe response frame and transmit the beacon frame and probe response frame including the information on the backup channel to the STAs.

While the backup channel is not actually used by the AP, communication between STAs can be performed in the backup channel. If the backup channel is changed, the AP can inform the STAs of the backup channel change through a channel switch announcement frame. Otherwise, the AP can include the information on the backup channel in the beacon frame and probe response frame and transmit the beacon frame and probe response frame to the STAs.

Table 3 shows an exemplary channel switching announcement action management frame format used when a channel being used by an AP in a WS frequency band is switched.

TABLE 3

| Order | Information |
|-------|-------------|
| 1 | Category |
| 2 | Action |
| 3 | Channel Switch Announcement element |
| 4 | Secondary Channel Offset element |
| 5 | Backup Channel element |

Compared to a channel switching announcement action management frame used in IEEE 802.11h/n, backup channel information is added to the channel switching announcement action management frame. Exemplary backup channel information is shown in Table 4.

TABLE 4

| | Element ID | Length | Backup Channel Number |
|---|---|---|---|
| Octets: | 1 | 1 | 1 |

In Table 4, the backup channel information can indicate a backup channel number. When the AP changes the backup channel because an incumbent user is present in the backup channel, the AP can transmit a channel switching announcement action management frame including the backup channel information. Otherwise, the AP can include the backup channel information in a beacon frame and probe response frame and transmit the beacon frame and probe response frame including the backup channel information.

Other Examples of WSM

The WSM includes information on whether a TV signal occupies a channel. The WSM can indicate the numbers of channels available for unlicensed devices at a specific time, maximum power levels allowed in the channels, and information on effective duration of each available channel in the form of a list.

An enabling STA can transmit a WSM to a dependent STA. A dependent AP enabled by the enabling STA can transmit a WSM to the dependent STA. This is for the purpose of efficiently supporting scanning procedures of dependent STAs operating in a TVWS, as described above. A description will be given of available formats of a WSM.

FIG. 8 illustrates one of the available formats of a WSM.

In the WSM format shown in FIG. 8, a "country code" field provides information on the location of a channel map following this field. That is, countries may have different TV bands and TV channel bandwidths, and different regulatory domains are assigned to the countries. Accordingly, the country code field helps recognize the physical location of a TV channel available for an STA that receives the WSM along with a channel map field. The country code field can signal a country string value of 3 octets. That is, the first 2 octets indicate a country code defined in ISO/IEC 3166-1 and the last octet means an environment. The country code field can include more detailed information than country information in an extensive manner. For example, the country code field can include a regional code value of a specific country.

Although the basic unit of a channel map that signals whether or not a channel is available is not limited to a TV channel bandwidth, it can be channel information in the smallest basic unit provided by a database of a corresponding regulatory domain. When the smallest basic unit constituting an available channel list provided by a database of a TVWS band is a TV channel bandwidth, the basic unit of a channel map becomes a TV channel bandwidth. The TV channel bandwidth of America and Korea is 6 MHz and some countries have TV channel bandwidths of 7 MHz and 8 MHz.

The channel map field includes the number of an available TV channel and a maximum transmit power level corresponding to each available TV channel according to FCC regulations.

FIGS. 9 and 10 illustrate exemplary channel map fields.

In FIG. 9, a WSM includes device type information, available channel numbers (N, M, . . . , K), maximum allowable power in each available channel, and information on valid time applied to the entire WSM. As described above, it is more desirable to inform a first mode device of the valid time for the entire WSM received by the first mode device rather than information on valid time for each available channel. In this case, the WSM format shown in FIG. 9 can be used.

FIG. 10 shows a WSM including device type information, available channel numbers (N, . . . , K), maximum allowable power in each available channel, and information on valid time for each available channel. As described above, it is desirable to inform a fixed device or a second mode device of information on valid time for each available channel. In this case, the WSM format shown in FIG. 10 can be used.

In FIGS. 9 and 10, K, M, N, L, S specify TV channel numbers.

FIG. 11 illustrates an exemplary channel map field.

While the channel map field may be signaled in a tuple of channel numbers and maximum transmit power levels, the channel map field can be signaled in a bitmap form as shown in FIG. 11 in consideration of overhead.

Otherwise, a channel map can be signaled as a bitmap in which the number of an available channel is 1 and the number of an unavailable channel is 0 from among all channels in a channel list. Here, since an available channel list depends on device type, the length of the entire channel list and a maximum allowable transmit power level for each channel can be determined according to device type.

TV channels available for transmission between TVWS 802.11 AP and STA have a bandwidth of 6 MHz in the US and correspond to channel numbers 21 to 51. That is, it is necessary to indicate whether primary users are present in 30 TV channels. A bitmap for. TV channels #21 to #51 can be configured in ascending order or descending order in such a manner that a channel in which a primary user is present is indicated by 0 (unavailable) and a channel in which a primary user is not present is indicated by 1 (available) or vice versa.

The device type indicates whether the corresponding channel map corresponds to a TV channel assigned to a personal/portable device or to a TV channel assigned to a fixed device. If the device type is 0, a channel bitmap (bits 1 to 30) may be bitmap information on TV channels #21 to #51. It may be necessary to indicate whether primary users are present in 54 to 60 MHz, 76 to 88 MHz, 174 to 216 MHz and 470 to 512 MHz which are assigned for communication between fixed devices when an STA that receives the channel map is a fixed device or as occasion demands. For this, when the device type is 1, bits 1 to 18 may be recognized as bitmap information.

In FIG. 11, "starting channel number (S)" represents the number of a TV channel from which a bitmap is started. "Number of channels (L)" represents the number of channels starting from the starting channel number in the bitmap indicated in the channel map. The length of the channel bitmap following "number of channels" field depends on the value of the "number of channels" field.

FIGS. 12 and 13 show exemplary channel maps.

FIG. 12 shows a case in which a database signals channels that are not used by licensed users using a frequency rather than signaling an available channel for each TV channel. Specifically, a start frequency that can be used and a stop frequency at which the corresponding available frequency block ends are indicated and maximum transmit power available in the corresponding frequency block is signaled. FIG. 13 shows a case in which information on valid time of each available frequency band is additionally signaled. In FIG. 12, since there is a high possibility that available frequency bands of unlicensed devices are discontinuous rather than continuous according to characteristics of used frequency of licensed users, a tuple of start frequency, stop frequency and maximum allowable transmit power can be repeated in the channel map field to signal a plurality of tuples. In FIG. 13, quadruplets of start frequency, stop frequency, maximum allowable transmit power and valid time may be repeated in the channel map field to signal a plurality of quadruplets.

FIGS. 14 and 15 show other exemplary channel maps.

FIGS. The channel maps shown in FIGS. 14 and 15 are used to signal a center frequency and an available band using a channel bandwidth when a frequency band that can be used at a specific time in a specific location is signaled. For example, if a frequency of 10 MHz on each of both sides of 690 MHz is available, this frequency band is signaled using a center frequency of 690 MHz and a channel bandwidth of 20 MHz. Here, maximum allowable transmit power for the frequency band can be signaled along with the frequency band. An available frequency band for each available channel block is signaled in this manner.

In an exemplary embodiment of the present invention, valid time information is signaled for each tuple. Since channels use frequencies in different patterns, the channels have different available durations. Accordingly, it is desirable to signal valid time information for each channel. However, when valid time information on a plurality of frequency blocks is signaled, signaling valid time for each available channel may increase overhead. Therefore, it may be more advantageous to signal a list of channels available the moment and valid time information on a currently signaled channel map according to the system, and thus in an embodiment of the present invention, a channel map includes valid time information on the entire channel map. In this case, the shortest valid time from among valid times of available channels signaled by the channel map is signaled.

Whether or not a specific channel is available depends on time. A value indicating how long channel availability information included in a channel map is valid for a device that currently transmits WM corresponding to the channel map is valid time information. When time information of the valid time field indicates that the channel availability information is valid until a specific time, the time information can be indicated as absolute time or relative time.

When the time information is indicated as relative time, the time information can be represented as information indicating a period of time starting from transmission time for which the channel availability information is valid. When the time information is represented as absolute time, the channel map can indicate valid time through UTC. That is, the channel map signals that the channel availability information is valid from a specific time irrespective of transmission time.

A device that has received a WSM determines whether the WSM is valid from a valid time field. The device recognizes a channel corresponding to a channel map indicated by the WSM as an available channel and use the channel if the WSM is valid, but needs to request a new WSM if not. That is, if a dependent AP has received an invalid WSM from an enabling STA, the dependent AP should request the enabling STA to transmit a valid WSM. Upon reception of this request, the enabling STA needs to transmit the valid WSM. If there is no valid WSM, the enabling STA preferably acquires valid channel information through database query and transmits the valid channel information to the dependent AP.

The channel map information in the above-mentioned embodiments can be exchanged between a database and unlicensed devices in all regulatory domains operating under the control of the database, and even between unlicensed devices. Particularly, the channel map information is preferably exchanged between an AP and an STA.

A device that accesses a database to acquire available channel information can be referred to as an AP or enabling STA, and a device that does not directly access the database but operates as a client of the AP or enabling STA can be referred to as an STA or dependent AP.

Application of Device Type of WSM

It is possible to respectively configure WSMs or channel maps for a fixed device and a personal/portable device. Furthermore, it is possible to transmit information commonly available for device types of the fixed device and personal/portable device and then additionally send available information only for a specific device type. That is, it is possible to set the device type to the personal/portable device, collect only information on channels additionally available for the personal/portable device, such as channels in proximity to a channel used by an incumbent user, and additionally transmit the collected information to the personal/portable device. It may be desirable to transmit MAP ID of a WSM in this manner.

FIGS. 16 and 17 are views referred to for describing a method of transmitting different information on available channels to devices in the situation of FIG. 4 according to an embodiment of the present invention.

For example, a WSM or channel map indicating that channel #3 is available at a maximum transmit power of 100 mW can be transmitted to the fixed device, and a WSM or channel map indicating that channel #3 is available at a maximum transmit power of 100 mW and channels #2 and #4 are available at a maximum transmit powers of 40 mW can be transmitted to the personal/portable device in the situation of FIG. 4.

FIGS. 18 and 19 are views referred to for describing a method for transmitting information on a common available channel to each device and then signaling an additional available channel to the personal/portable device in the situation of FIG. 4 according to another embodiment of the present invention.

In this embodiment, a WSM or channel map indicating that channel #3 is available at a maximum transmit power of 100 mW, as shown in FIG. 18, can be commonly transmitted to the fixed device and the personal/portable device, and then a WSM or channel map having a device type set to the personal/portable device and indicating that channels #2 and #4 are available at a maximum transmit power of 40 mW, as shown in FIG. 19, can be additionally signaled in the situation of FIG. 4. Here, it is desirable to transmit the additionally signaled WSM using the same MAP ID as that of the commonly signaled WSM such that devices receiving the WSMs can easily combine the WSMs having the same MAP ID.

Different spectrum masks can be supported for devices having the same device type (fixed or personal/portable device type). In this case, a device using a specific spectrum mask needs to meet a minimum reduction value of power spectral density according to an offset frequency set in the spectrum mask. If different spectrum mask classes are supported, different available channels and maximum allowable power levels may be allocated for devices.

Figure 20:
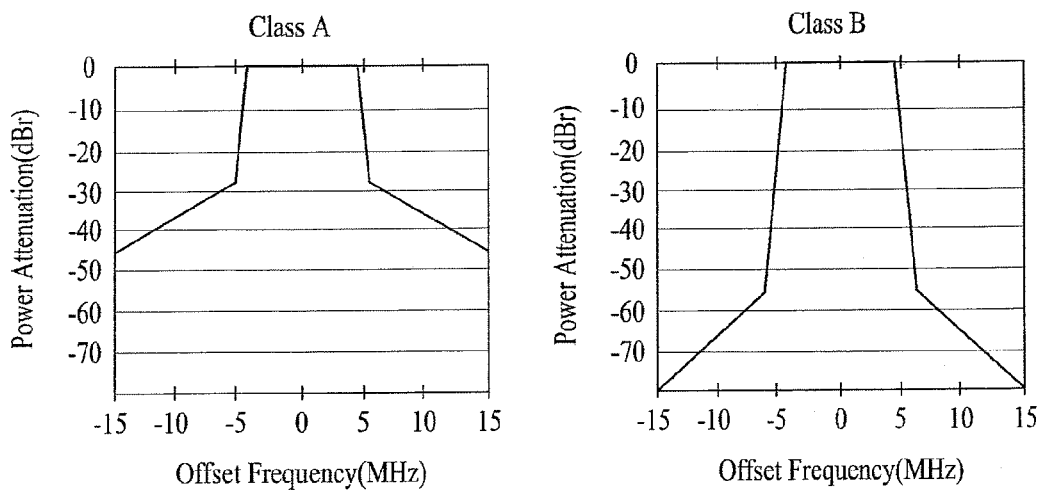
FIG. 20 illustrates two exemplary frequency mask classes for describing an embodiment of the present invention.

FIG. 20 illustrates two different exemplary spectrum mask classes for describing an embodiment of the present invention.

As shown in FIG. 20, two different spectrum mask classes can be defined according to regulations. In the example of FIG. 20, spectrum mask class B has more strict restrictions than spectrum mask class A.

When a spectrum mask having a sharper edge is used, it is possible to use higher power in channels next to a channel used by an incumbent user while meeting conditions of interference in the incumbent user, specified by regulations. For example, if two personal/portable devices use different spectrum masks, as shown in FIG. 21, different channel maps having different maximum power levels in the same TV channel can be configured.

That is, in an embodiment of the present invention, spectrum mask classes are set for respective devices in addition to devices types indicating a fixed device and a personal/portable device. Exemplary device types according to the current embodiment are shown in Table 5.

TABLE 5

| Device Type | Description |
| --- | --- |
| 0 | Reserved |
| 1 | Fixed and Personal/Portable Device |
| 2 | Fixed Device |
| 3 | Personal/Portable Device |
| 4 | Personal/Portable Device (Spectrum Mask Class A) |
| 5 | Personal/Portable Device (Spectrum Mask Class B) |
| 6-255 | Reserved |

In Table 5, device type 1 indicates that a corresponding channel map is equally applied to fixed and personal/portable devices. Device type 2 represents that the channel map is information about a channel available only for the fixed device. Device type 3 means that the channel map can be used by the personal/portable device. Device types 4 and 5 indicate channel information available for different spectrum mask classes supported by the personal/portable device, and represent that different channel maps are configured depending on the spectrum mask classes. Different available channel information depending on spectrum mask classes can also be provided to the fixed device.

Figure 22:
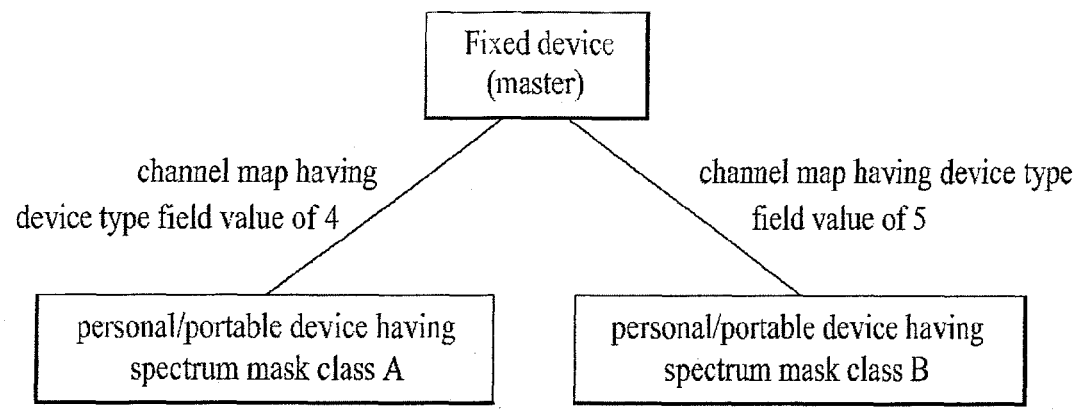
FIG. 22 illustrates application of device types for transmitting different channel maps to personal/mobile devices that support different spectrum mask classes according to an exemplary embodiment of the present invention.

FIG. 22 illustrates an example of using the device type field in order to transmit different channel maps to personal/portable devices that support different spectrum mask classes.

For example, the WSM or channel map with device type of 4 in Table 5 can be transmitted to a personal/portable device having spectrum mask class A, and the WSM or channel map with device type of 5 in Table 5 can be transmitted to a personal/portable device having spectrum mask class B.

In a band in which a channel available for unlicensed devices is varied by a licensed device temporally and spatially, such as TVWS, operation of an unlicensed device may interfere with the licensed device when a spectrum mask used by an AP in specific BSS is different from a spectrum mask used by STAB. That is, when the AP accesses a database to acquire an available channel list, the database signals a specific channel as an available channel on the condition that the licensed device does not use the channel at corresponding time on the assumption that the unlicensed device meets out-band-emission requirement for neighboring channels. According to current FCC regulations, the spectrum mask with respect to out-band emission for neighboring channels is −55 dBr. When a DTV uses channels #13 and #15 and does not use channel #14, for example, the database can signal channel #14 as an available channel. However, it is necessary to meet out-band-emission requirements of channels #13 and #15 in order to use channel #14. Accordingly, if the spectrum mask of a specific STA belonging to the AP is less strict than the spectrum mask of the AP and thus it does not satisfy regulations, the corresponding system is regarded to violate the regulations even though the spectrum mask of the AP perfectly meets the out-band-emission requirement. Therefore, exchange of information on spectrum masks needs to be performed in an association procedure after the AP receives the available channel list according to the above condition.

The AP preferably includes information on the spectrum mask thereof in a beacon, (re-)association response and probe response frame and transmits the information. An STA that has received this information preferably transmits a signal using a spectrum mask stricter than the spectrum mask signaled by the AP.

The STA preferably includes information on the spectrum mask thereof in a probe request frame, and (re-) association request and transmits the information. If the spectrum mask of the STA is not stricter than the spectrum mask used by the AP, the AP can designate a transmit power level that can be used by the STA for each spectrum mask.

Specifically, the STA can signal a spectrum mask type supported by the STA to a probe response frame or association request frame. The spectrum mask type may have a format such as the format shown in FIG. 20. Two or more spectrum mask types may be defined. In this case, if the AP supports spectrum mask class A and the spectrum mask included in a probe response frame and transmitted by the STA corresponds to spectrum mask class B, the AP preferably calculates an appropriate power level to meet the out-band-emission requirement so as to set transmit power of the STA supporting spectrum mask class B. Here, the AP can set a power level that can be used by the STA in the probe response frame.

Configuration of Apparatus

Figure 23:
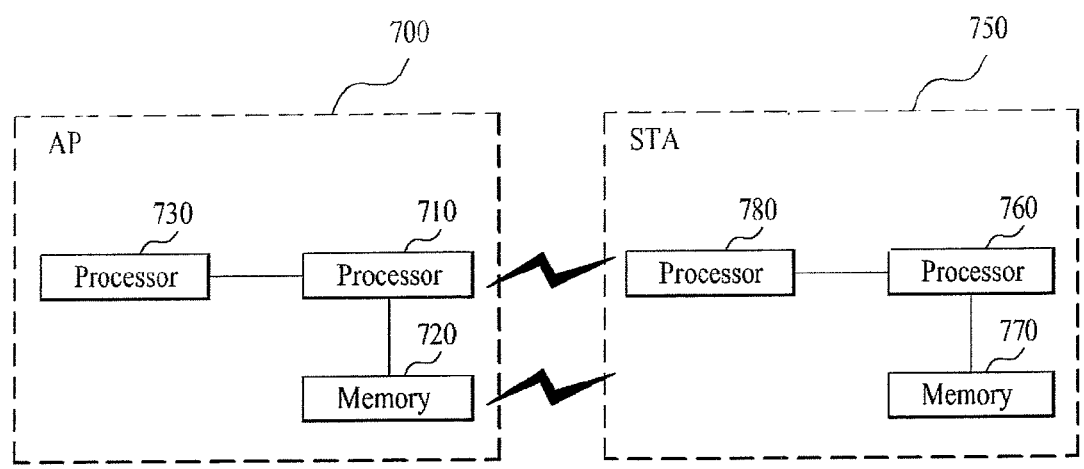
FIG. 23 illustrates a configuration of an AP and an STA according to an exemplary embodiment of the present invention.

FIG. 23 is a block diagram illustrating a configuration of an AP 700 and an STA 750 according to an embodiment of the present invention.

Referring to FIG. 23, the AP 700 and STA 750 include transceivers 730 and 780, processors 710 and 760, and optionally memories 720 and 770, respectively. In the WLAN system shown in FIG. 1, the database and/or RLS may have a configuration similar to the configuration shown in FIG. 23.

The transceiver 730 of the AP 700 can transmit/receive an available channel information request message/available channel information response message to/from the database (RLS) or STA. The available channel information response message may include (a) identification information on an available channel, (b) information on the maximum allowable power level in the available channel, and (c) information on valid time of the available channel, as described above. The processor 710 of the AP 700 can control the AP 700 to perform a WLAN operation within an allowable power level in an available channel for valid time of the available channel on the basis of the received information. The AP 700 can store WSM information in the memory 720 for the valid time.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

INDUSTRIAL APPLICABILITY

While the above-described embodiments of the present invention have been described based on IEEE 802.11 systems, the embodiments can be equally applied to various mobile communication systems in which an unlicensed device can operate by acquiring information on an available channel.

What is claimed is:

1. A method for channel switch in a wireless communication system, the method comprising:
  receiving, at a second station, an available channel information message from a device having database information, the available channel information message comprising:
  identification information for an available channel;
  information on a device type to which the available channel information message can be applied; and
  when the information on the device type corresponds to a fixed device or a second mode device having an authority to directly access the database information, the available channel information message includes information on a valid time of the available channel,
  wherein the second station operates on the available channel based on the received available channel information message;
  receiving, at the second station from a first station, a channel switch request frame comprising target channel information and transmit power control information for the target channel;
  transmitting, by the second station to the first station, a channel switch response frame; and
  transmitting, by the second station to the first station, a signal on the target channel,
  wherein parameters in the transmit power control information of the channel switch request frame are used for calculation of transmit power of the signal transmitted by the second station on the target channel, and
  wherein the information on the valid time is not included in the available channel information message when the information on the device type corresponds to a first mode device having no authority to directly access the database information.

2. The method according to claim 1, wherein the transmit power control information comprises maximum transmit power information for the target channel.

3. The method according to claim 1, wherein the transmitting the signal on the target channel is performed over a direct link between the first station and the second station.

4. The method according to claim 1, wherein the channel switch comprises a Tunneled Direct Link Setup (TDLS) channel switch.

5. The method according to claim 1, wherein the target channel comprises an off-channel that is not used by an Access Point (AP).

6. The method according to claim 1, wherein a maximum transmit power on the target channel is determined, by the second station, as a lowest transmit power value among different transmit power values included in the transmit power control information.

7. A station supporting channel switch in a wireless communication system, the station comprising:
a transceiver configured to:
receive, at the station operating as a second station, an available channel information message from a device having database information, the available channel information message comprising:
identification information for an available channel;
information on a device type to which the available channel information message can be applied; and
when the information on the device type corresponds to a fixed device or a second mode device having an authority to directly access the database information, the available channel information message includes information on a valid time of the available channel;
receive, at the station, operating as the second station, from a first station, a channel switch request frame comprising target channel information and transmit power control information for the target channel; and transmit, from the station, operating as the second station, to the first station, a channel switch response frame; and a processor configured to:
operate on the available channel; and
control the transceiver to perform transmitting a signal on the target channel,
wherein parameters in the transmit power control information of the channel switch request frame are used for calculation of transmit power of the signal transmitted from the station, operating as the second station, on the target channel, and
wherein the information on the valid time is not included in the available channel information message when the information on the device type corresponds to a first mode device having no authority to directly access the database information.

8. The station according to claim 7, wherein the transmit power control information comprises maximum transmit power information for the target channel.

9. The station according to claim 7, wherein the processor controls the transceiver to transmit the signal on the target channel over a direct link between the first station and the second station.

10. The station according to claim 7, wherein the channel switch comprises a Tunneled Direct Link Setup (TDLS) channel switch.

11. The station according to claim 7, wherein the target channel comprises an off-channel that is not used by an Access Point (AP).

12. The station according to claim 7, wherein a maximum transmit power on the target channel is determined, by the second station, operating as the second station, as a lowest transmit power value among different transmit power values included in the transmit power control information.

* * * * *